(12) United States Patent  
Uedaira et al.

(10) Patent No.: US 9,525,485 B2  
(45) Date of Patent: Dec. 20, 2016

(54) VISIBLE LIGHT COMMUNICATION SYSTEM

(71) Applicant: Rohm Co., Ltd., Kyoto (JP)

(72) Inventors: Yoshitsugu Uedaira, Kyoto (JP); Nobuyuki Yamagishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 178 days.

(21) Appl. No.: 14/320,705

(22) Filed: Jul. 1, 2014

(65) Prior Publication Data

US 2015/0010308 A1 Jan. 8, 2015

(30) Foreign Application Priority Data

Jul. 4, 2013 (JP) .................................. 2013-140482

(51) Int. Cl.
*H04B 10/00* (2013.01)
*H04B 10/116* (2013.01)

(52) U.S. Cl.
CPC .................................. *H04B 10/116* (2013.01)

(58) Field of Classification Search
CPC ... H04B 10/116; H04B 10/1149; H04B 10/40; H04B 10/0795; H04B 10/11; H04B 10/1143; H04B 1/202; H04N 5/2357; H04N 9/3111
USPC ................ 398/128, 131, 118, 172, 182, 183, 195,398/197, 202, 212, 213, 106, 130, 209, 203
See application file for complete search history.

(56) References Cited

U.S. PATENT DOCUMENTS

| | | | | | |
|---|---|---|---|---|---|
| 5,239,295 | A | * | 8/1993 | DeLuca | H04B 10/116 340/7.4 |
| 7,554,480 | B2 | * | 6/2009 | Nakata | H03M 1/14 341/155 |
| 8,019,229 | B2 | * | 9/2011 | Fujiwara | H04B 10/1143 340/815.65 |
| 8,332,139 | B2 | * | 12/2012 | Bae | G01C 21/00 701/408 |
| 8,513,892 | B2 | * | 8/2013 | Uedaira | G01J 1/02 250/208.2 |
| 8,554,084 | B2 | * | 10/2013 | Song | H04B 10/116 398/118 |
| 8,620,154 | B2 | * | 12/2013 | Li | H04W 76/028 398/1 |
| 8,798,912 | B2 | * | 8/2014 | Bae | G01C 21/00 701/408 |
| 8,965,218 | B2 | * | 2/2015 | Son | H04B 10/116 398/118 |
| 9,107,039 | B2 | * | 8/2015 | Bae | G01C 21/00 |
| 2006/0056855 | A1 | * | 3/2006 | Nakagawa | G09F 9/33 398/183 |
| 2007/0147843 | A1 | * | 6/2007 | Fujiwara | H04B 10/1143 398/118 |
| 2008/0095533 | A1 | * | 4/2008 | Lee | H04B 10/116 398/38 |

(Continued)

FOREIGN PATENT DOCUMENTS

JP 2012-099009 5/2012

*Primary Examiner* — Hibret Woldekidan  
(74) *Attorney, Agent, or Firm* — Fish & Richardson P.C.

(57) ABSTRACT

A visible light communication system comprising a first electronic device having a display part and a second electronic device 20 having a brightness sensor, visible light communication between the first electronic device and the second electronic device occurring as a result of the brightness sensor detecting visible light (solid arrow) output from the display part.

6 Claims, 8 Drawing Sheets

(56) References Cited

U.S. PATENT DOCUMENTS

| | | | |
|---|---|---|---|
| 2008/0131140 A1* | 6/2008 | Shin | H04B 10/116 398/172 |
| 2008/0253766 A1* | 10/2008 | Yu | H04B 10/1143 398/41 |
| 2009/0312987 A1* | 12/2009 | Uedaira | G01J 1/18 702/189 |
| 2010/0054748 A1* | 3/2010 | Sato | H04B 10/116 398/130 |
| 2010/0209118 A1* | 8/2010 | Takene | H04B 10/116 398/182 |
| 2011/0260629 A1* | 10/2011 | Uedaira | G01J 1/02 315/158 |
| 2012/0155889 A1* | 6/2012 | Kim | H04B 10/116 398/193 |
| 2012/0257901 A1* | 10/2012 | Yamada | H04B 10/116 398/130 |
| 2012/0274218 A1* | 11/2012 | Mountain | H04M 1/22 315/152 |
| 2012/0321321 A1* | 12/2012 | Riesebosch | H04B 10/116 398/118 |
| 2014/0205136 A1* | 7/2014 | Oshima | G09G 3/20 382/100 |

\* cited by examiner

| 2BIT DATA | 4PPM DATA | Idrv |
|---|---|---|
| 00 | 1000 |  |
| 01 | 0100 |  |
| 10 | 0010 |  |
| 11 | 0001 |  |

VISIBLE LIGHT COMMUNICATION SYSTEM

CROSS-REFERENCE TO RELATED APPLICATIONS

This application is based upon and claims the benefit of priority from the corresponding Japanese Patent Application No. 2013-140482 filed on Jul. 4, 2013, the entire contents of which are incorporated herein by reference.

BACKGROUND OF THE INVENTION

1. Field of the Invention

The present invention relates to a visible light communication system.

2. Description of the Related Art

In the past, IrDA (infrared data association) has been widely known as a standard for short-distance wireless communication.

An example of the prior art related to the present invention is Japanese Unexamined Patent Application No. 2012-099009.

However, because IrDA involves carrying out communication using infrared light, it is necessary to block visible light other than infrared light at the set or at the module, and a special-purpose infrared light communication module has thus been necessary. In addition, existing IrDA systems are rarely used overseas, and so there are also issues with implementing the systems in globally standardized electronic devices.

In recent years, visible light communication systems also have been offered that employ visible light instead of infrared light. However, there is still opportunity for various investigations concerning specific techniques for providing electronic devices with the capability of visible light communication.

For example, when providing electronic devices with the capability of visible light communication, the simplest technique is to incorporate a special-purpose visible light communication module. However, such techniques have the problem of increasing the size and cost of the electronic device.

SUMMARY OF INVENTION

In light of the above problems that were discovered by the inventors of this application, an aim of the invention that is disclosed in this specification is to provide a visible light communication system whereby it is possible to inhibit size and cost increases in electronic devices on the transmission side and on the receiving side, and also to provide an electronic device that uses this system, as well as a control program for the system.

The visible light communication system that is disclosed in this specification comprises a first electronic device that includes a display part and a second electronic device that includes a brightness sensor, with visible light communication between the first electronic device and the second electronic device occurring as a result of the brightness sensor detecting visible light that has been output from the display part.

In addition, the electronic device that has been disclosed in this specification comprises a display part, a display driving part for drive-controlling the display part, and a control part that controls the display driving part so that ON/OFF control of the display part is carried out in accordance with transmitted data during data transmission by visible light communication.

In addition, the electronic device that is disclosed in this specification comprises a brightness sensor, a first light-receiving circuit for brightness detection, a second light-receiving circuit for visible light communication, a selector that switches the connection point of the brightness sensor to the first light-receiving circuit or the second light-receiving circuit, and a control part for controlling the selector in accordance with whether data is being received by visible light communication.

The electronic device that is disclosed in this specification comprises a display part, a brightness sensor, a display drive part for drive-controlling the display part, a first light-receiving circuit for brightness detection, a second light-receiving circuit for visible light communication, a selector that switches the connection point of the brightness sensor to the first light-receiving circuit or the second light-receiving circuit, and a control part for controlling the selector in accordance with whether data is being received by visible light communication, while also controlling the display drive part so that ON/OFF control of said display part is carried out in accordance with the transmitted data during data transmission by visible light communication.

Other characteristic features of the present invention relating to essential elements, steps, advantages, and features are clarified below in the Detailed Description of Preferred Embodiments section, along with the attached drawings associated therewith.

BRIEF DESCRIPTION OF DRAWINGS

FIG. 3 Circuit diagram showing a configuration example of the first light-receiving circuit 14a.

DETAILED DESCRIPTION OF REFERRED EMBODIMENTS

Visible Light Communication System

Figure 1:
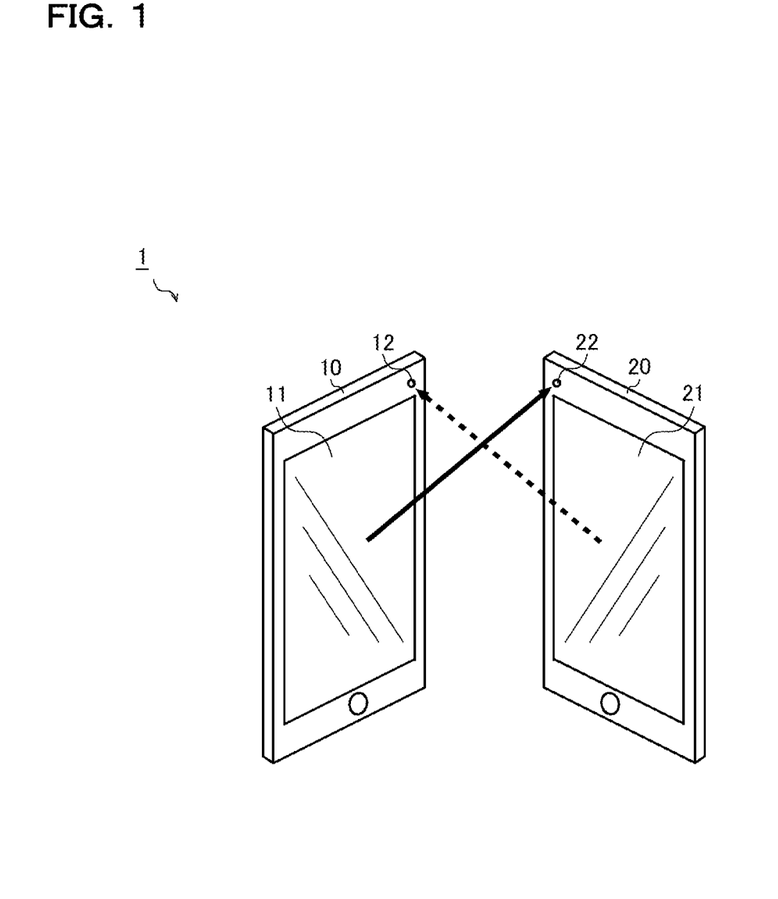
FIG. 1 Configuration example of the visible light communication system.

FIG. 1 shows a configuration example of the visible light communication system. The visible light communication system 1 of this configuration example comprises electronic devices 10 and 20, with 1:1 two-way communication occurring between the two devices using visible light (refer to the solid arrow and broken arrow in the drawing).

The electronic devices 10 and 20 respectively comprise display parts 11 and 21 and brightness sensors 12 and 22. In FIG. 1, an example of a configuration was shown in which smart phones (multifunctional portable telephone terminals) were used as the electronic devices 10 and 20, but other devices that are suitable for use as the electronic devices 10 and 20 include any portable device such as a digital camera or tablet data terminal. In addition, as described below, there are no restrictions concerning the use of non-portable devices (e.g., stationary televisions or overhead lighting) as the electronic devices that constitute the visible light communication system 1.

The display parts 11 and 21 are means for displaying text or graphics, and a device such as an LCD (liquid crystal display) panel or an OELD (organic electroluminescence display) panel may be used.

The brightness sensors 12 and 22 are means for detecting the surrounding brightness, and a photodiode or phototransistor, or the like, may be used. The electronic devices 10 and 20 have the capability of automatically adjusting the brightness of the display parts 11 and 21 in accordance with the outputs of the respective brightness sensors 12 and 22.

The visible light communication system 1 of this configuration example carries out data transmission from the electronic device 10 to the electronic device 20 as a result of the brightness sensor 22 of the electronic device 20 detecting the visible light that has been output from the display part 11 of the electronic device 10 (refer to the solid arrow) and also carries out data transmission from the electronic device 20 to the electronic device 10 as a result of the brightness sensor 12 of the electronic device 10 detecting the visible light output from the display part 21 of the electronic device 20 (refer to the broken arrow).

In additional detail, the electronic devices 10 and 20 respectively carry out on/off control of the display parts 11 and 12 in accordance with transmitted data at the time of data transmission by visible light communication, and, along therewith, switch whether the output of the brightness sensors 12 and 22 is used for brightness detection or visible light communication in accordance with whether data transmission is occurring by visible light communication.

As a result of this type of configuration, it is possible to use the display parts 11 and 21 as visible light transmission parts and to use the brightness sensors 12 and 22 as visible light receiving parts, without separately including a special-purpose visible light communication module with the electronic devices 10 and 20. Consequently, it is possible to realize a visible light communication system 1 without causing increases in size or cost of the electronic devices 10 and 20.

The two-way communication described above relates not only to cases in which data transmission is carried out back and forth between the electronic device 10 and the electronic device 20, but also to cases in which an acknowledge response from the receiving side is sent to the transmitting side during data transmission from the transmission side to the receiving side.

Electronic Devices

Figure 2:
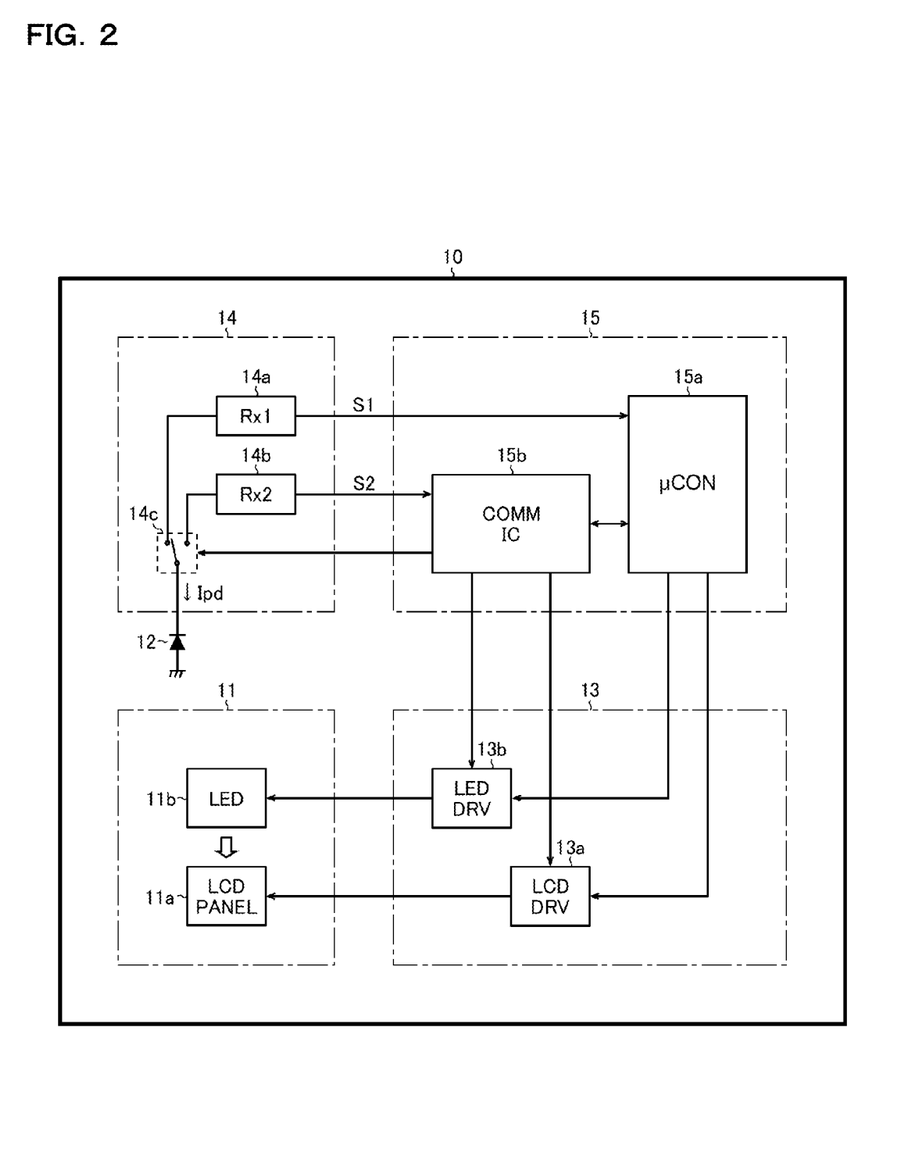
FIG. 2 Block diagram showing a configuration example of the electronic device 10.

FIG. 2 is a block diagram showing a configuration example of the electronic device 10 (only the portions specifically related to the visible light communication function). The electronic device 10 of this configuration example comprises a display part 11, a brightness sensor 12, a display drive part 13, a light receiving part 14, and a control part 15. The electronic device 20 has the same configuration as the electronic device 10, and thus duplicate descriptions are omitted.

The display part 11 is a means for displaying text, graphics, and the like and includes an LCD panel 11a and an LED (light-emitting diode) hack light 11b. The LCD panel 11a controls the light transmittance of each of the liquid crystal elements that are arranged in the form of a matrix, thereby forming the desired display image. The LED back light 11b outputs white light in order to illuminate the LCD panel 11a from the back surface.

The brightness sensor 12 is the means for detecting the surrounding brightness, and a photodiode is used in this configuration example. The brightness sensor 12 generates a photoelectric current Ipd in accordance with the surrounding brightness, In FIG. 2, the brightness sensor 12 is illustrated as a discrete component for ease of description, but the brightness sensor 12 also may be included in a single package (or module) along with the light-receiving part 14.

The display drive part 13 is a means for carrying out driving control of the display part 11 and comprises an LCD driver 13a and an LED driver 13b. The LCD driver 13a carries out drive control of the LCD panel 11a in accordance with instructions from the control part 15. The LED driver 13b carries out drive control of the LED back light 11b in accordance with instructions from the control part 15.

The light-receiving part 14 is a means for detecting the photoelectric current Ipd that has been generated at the brightness sensor 12 and comprises a first light-receiving circuit 14a, a second light-receiving circuit 14b, and a selector 14c. The first light-receiving circuit 14a is a light-receiving circuit for brightness detection which generates a brightness detection signal S1 from the photoelectric current Ipd. The second light-receiving circuit 14b is a light-receiving circuit for visible light communication and generates light-receiving data S2 from the photoelectric current Ipd. The selector 14c switches the connection point of the brightness sensor 12 between the first light-receiving circuit 14a and the second light-receiving circuit 14b in accordance with instructions from the control part 15.

The control part 15 is a means for carrying out overall control of the electronic device 10 and comprises a microcomputer 15a and a visible light communication IC 15b. The microcomputer 15a has a function whereby the LCD driver 13a is controlled in accordance with the display data that is input from an image source not shown in the drawings and a function whereby automated control is carried out on the brightness of the LED back light 11b in accordance with the brightness detection signal S1 that is input from the first light-receiving circuit 14a. In addition, the microcomputer 15a reads a predetermined control program (program conferring visible light communication functionality) from a memory not shown in the drawings and controls operation of the visible light communication IC 15b, while also having a function whereby it exchanges visible light communication data (transmitted data and received data) with the visible light communication IC 15b.

The visible light communication IC 15b is a semiconductor device that is specialized for visible light communication functionality and has a function whereby the LED driver 13b is controlled so that on/off control of the LED back light 11b is carried out in accordance with transmitted data input from the microcomputer 15a during data transmission by visible light communication. In addition, the visible light communication IC 15b also has a function whereby the selector 14c is controlled in accordance with whether data transmission by visible light communication is occurring. The visible light communication IC 15b also has a function whereby the received data S2 that has been input from the second light-receiving circuit 14b is transmitted to the microcomputer 15a.

First Light-Receiving Circuit

Figure 3:
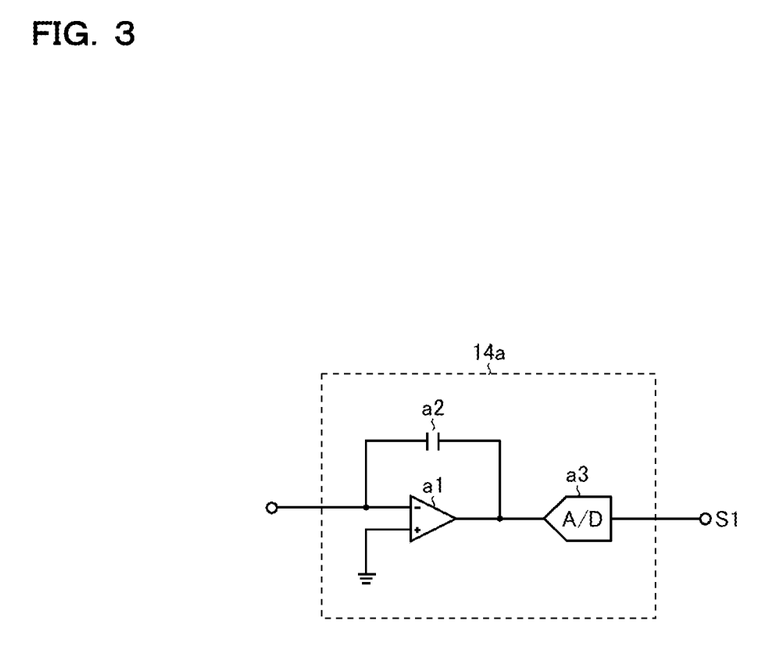

FIG. 3 is a circuit diagram showing a configuration example of the first light-receiving circuit 14a. With the first light-receiving circuit 14a of this configuration example, the first light-receiving circuit 14a comprises an operational amplifier a1, a capacitor a2, and an A/D (analog to digital) converter a3.

The non-inverting input terminal (+) of the operational amplifier a1 is connected to the reference potential terminal The inverting input terminal (−) of the operational amplifier a1 is connected to the brightness sensor 12 via the selector 14c. The capacitor a2 is connected between the inverting input terminal (−) and the output terminal of the operational amplifier a1. The output terminal of the operational amplifier a1 is connected to the input terminal of the A/D converter a3. The output terminal of the A/D converter a3 corresponds to the output terminal of the brightness detection signal S1.

The first light-receiving circuit 14a having the configuration described above generates a brightness detection signal S1 by integrating the photoelectric current Ipd that is generated by the brightness sensor 12. Adopting this configuration makes it possible to extract middle- and long tetra variation in the photoelectric current Ipd, and generate a brightness detection signal S1 corresponding to the surrounding brightness.

Second Light-Receiving Circuit

Figure 4:
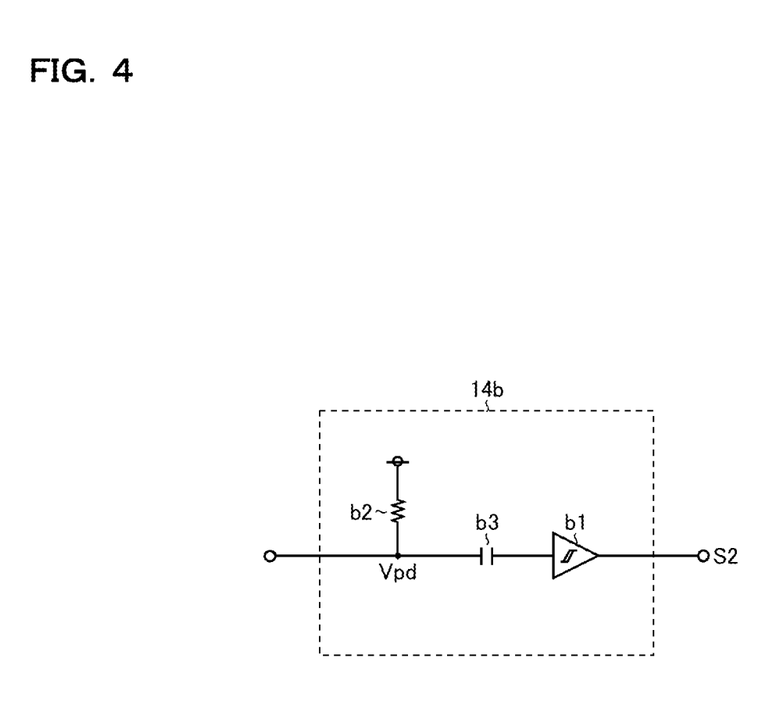
FIG. 4 Circuit diagram showing a configuration example of the second light-receiving circuit 14b FIG. 5 Table for describing the main features of the 4PPM format.

FIG. 4 is a circuit diagram showing a configuration example of the second light-receiving circuit 14b. The second light-receiving circuit 14b of this configuration example comprises a summit trigger b1, a resistor b2, and a capacitor b3.

The first terminal of the resistor b2 is connected to the power source terminal. The second terminal of the resistor b2 and the first terminal of the capacitor b3 are connected to each other, and the connection node thereof (application terminal of the voltage signal Vpd) is connected to the brightness sensor 12 via the selector 14c. The second terminal of the capacitor b3 is connected to the input terminal of the summit trigger b1. The output terminal of the summit trigger b1 corresponds to the output terminal of the received data S2.

The second light-receiving circuit 14b having the configuration described above inputs the voltage signal. Vpd to the summit trigger b1 in accordance with the photoelectric current Ipd and generates the received data S2. Specifically, the received data S2 goes to high when the voltage signal Vpd is higher than the threshold voltage of the summit trigger b1 and goes to low when the voltage signal Vpd is lower than the threshold voltage of the summit trigger b1. As a result of this configuration, it is possible to generate the received data S2 from the photoelectric current Ipd that is pulse-driven with an extremely short period.

Drive Current Control

Figure 5:
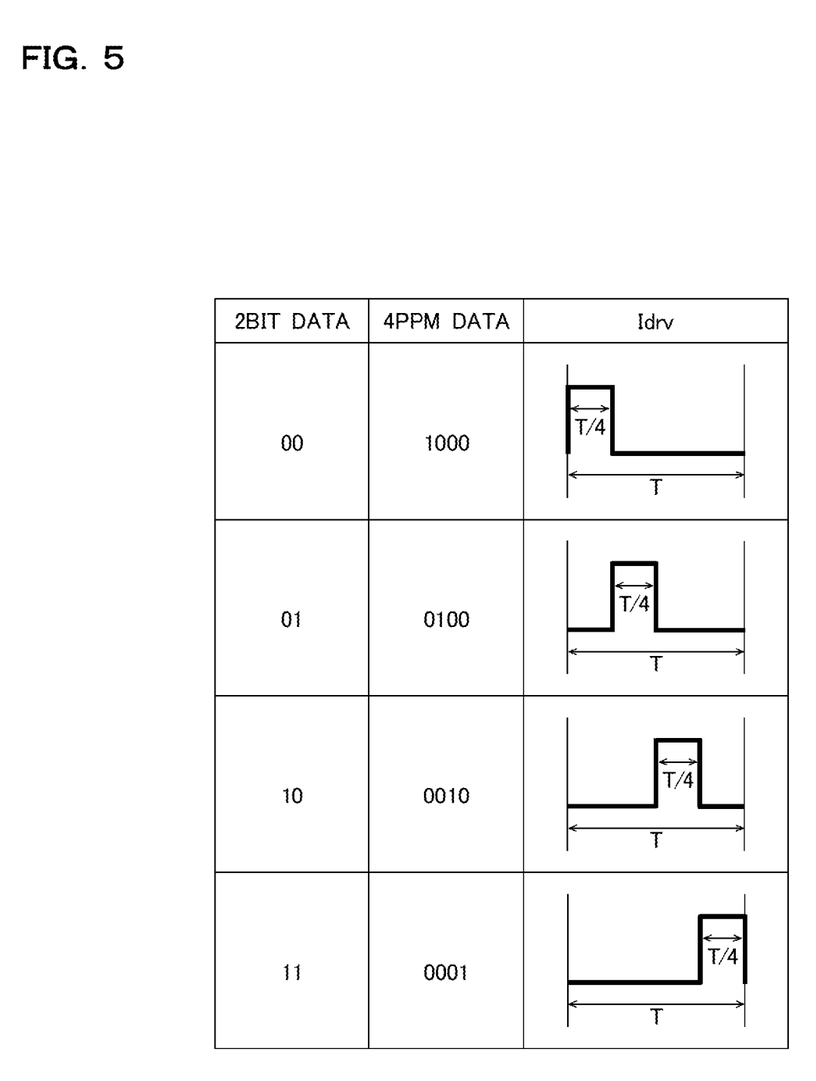

Next, drive current control (on/off control) of the LED back light 11b during visible light communication (data transmission) will be described. FIG. 5 is a table for describing the main features of the four-pulse position modulation format (referred to below as "4PPM format"). The table shows, sequentially from the left, the transmitted data (2-bit data), the 4PPM data, and drawings of the waveform of the drive current Idrv flowing to the LED back light 11b.

As shown in FIG. 5, in the 4PPM format, a predetermined period T (e.g., 500 ns) is divided equivalently into four time periods, and 2-bit transmitted data is transmitted by switching to four pulse positions (pulse generation time periods). More specifically, if the transmitted data is "00", then the 4PPM data becomes "1000", and the drive current Idrv flows in the first (lead) time period division. If the transmitted data is "01", then the 4PPM data becomes "0100", and the drive current Idrv flows in the second time period division. If the transmitted data is "10", then the 4PPM data becomes "0010", and the drive current Idrv flows during the third time period division. If the transmitted data is "11", then the 4PPM data becomes "0001", and the drive current Idrv flows during the fourth (last) time period division.

In this manner, it is possible to output two-bit transmission data for each period T by controlling the drive current Idrv of the LED back light 11b in accordance with the 4PPM format.

Figure 6:
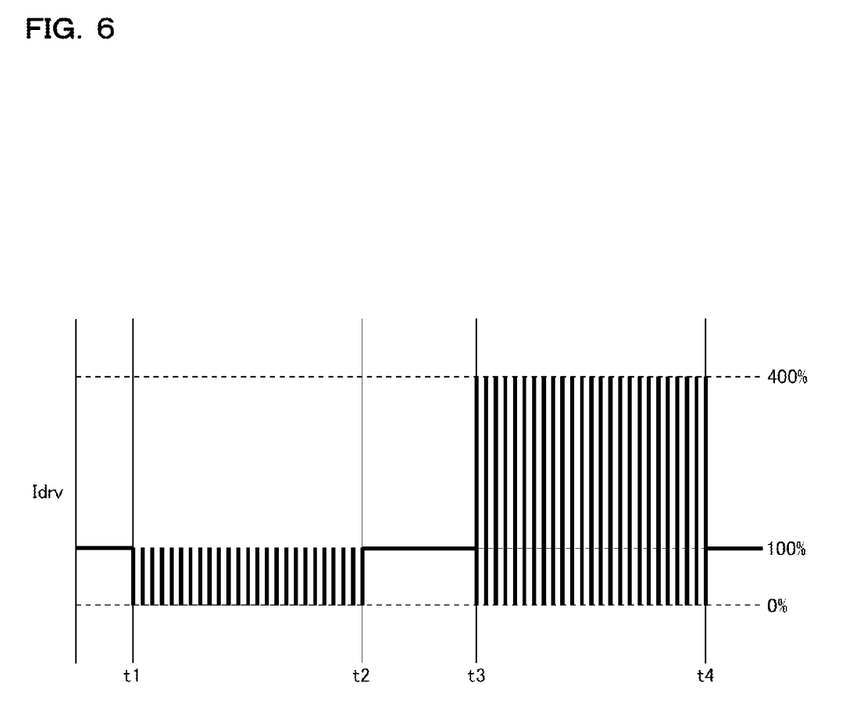
FIG. 6 Time chart showing a control example for the drive current Idrv.

FIG. 6 is a time chart showing a control example for the drive current Idrv. When the drive current Idrv of the LED back light 11b is controlled using the 4PPM format, the ON duty of the drive current Idrv (ratio of ON periods of the drive current Idrv over a predetermined period T) is ¼. For this reason, when visible light communication has been initiated without any change in the current level of the drive current Idrv that is set for normal times (prior to time t1), the brightness of the display part 11 decreases greatly during visible light communication (time t1 to t2), which will create an unpleasant feeling in the user.

In order to eliminate the undesirable situation described above, it is preferable to increase the drive current Idrv of the LED back light 11b during data transmission by visible light communication to a value that is greater than for normal times. For example, taking the current value of the drive current Idrv that is set for a normal time (time t2 to t3) as 100%, the drive current Idrv should be made to flow at four times this value (400%) during data transmission by visible light communication (time t3 to t4). By controlling the drive current in this manner, the user is prevented from experiencing an unpleasant feeling, because change in brightness of the LED back light 11b can be resolved before and after to initiation of visible light communication.

When improving communication accuracy or extending communication distance is prioritized over preventing changes in brightness of the LED back light 11b, the maximum drive current Idrv that can flow to the LED back light 11b may be provided completely irrespective of the current value of the drive current Idrv that has been set for normal times.

Display Control

Figure 7:
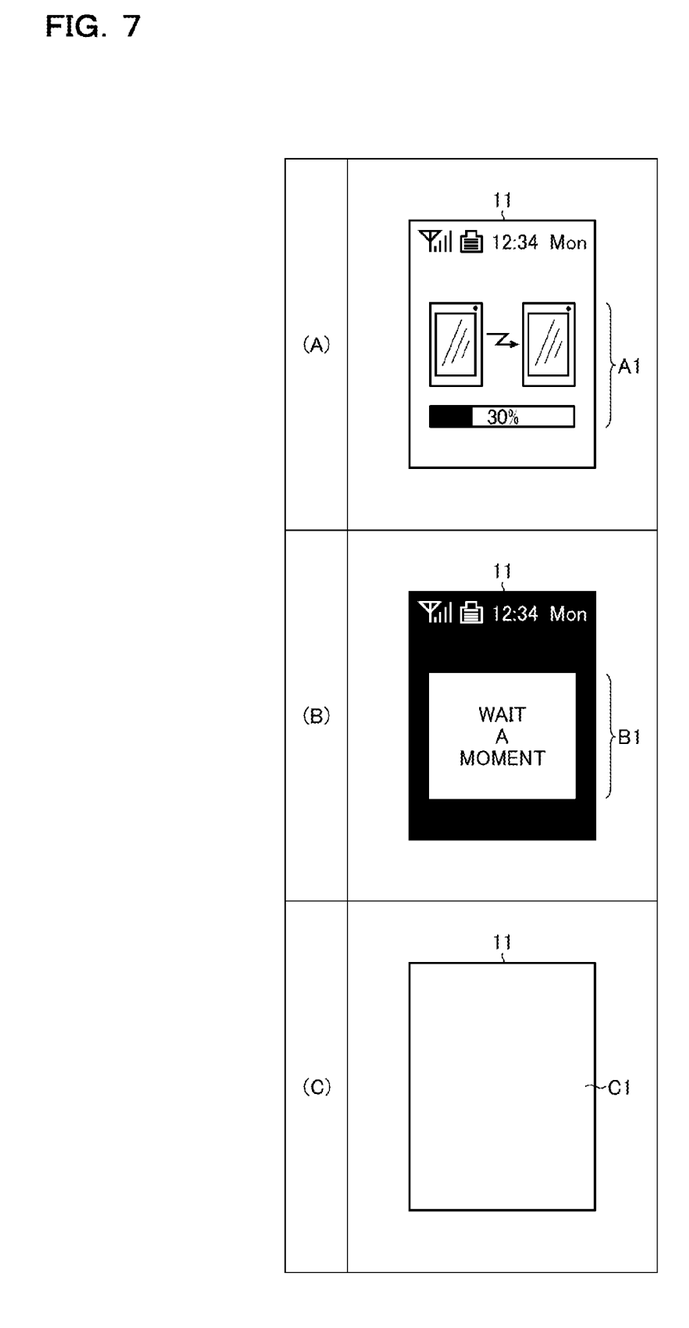
FIG. 7 Table showing a display example during visible light communication.

FIG. 7 is a table that shows a display example during visible light communication (during data transmission). In section (A), a display example for output of the progress display A1 to the display part 11 is depicted. By outputting progress display A1 of this type, the user can ascertain at a glance the state of progress of visible light communication. When this display example is utilized, it is preferable to create a progress display A1 design using, for example, a monochromatic display for the background (preferably a white display) so that the progress display A1 does not impede visible light communication.

In section (B), a display example is depicted in which a completely white window display B1 is output to the display part 11. As a result of outputting this type of completely white window display B1, it is possible to exclusively use a part of the display part 11 as the visible light communication part, independent of the background color or wallpaper image of the display part 11. A message or the like indicating that visible light communication is underway may be displayed on the interior of the completely white window display B1.

In section (C), a display example is depicted in which a completely white full-screen display C1 is output to the display part 11. As a result of outputting this type of completely white full-screen display C1, the entire surface of the display part 11 can be maximally utilized as the visible light transmission part, and so improvement in communication accuracy or extension of communication distance can be realized.

Modification Example

In the above embodiments, examples were described that employed configurations in which two smart phones were used, and two-way visible light communication was carried out. However, various modifications are possible to the configuration of the visible light communication system, without any restrictions.

Figure 8:
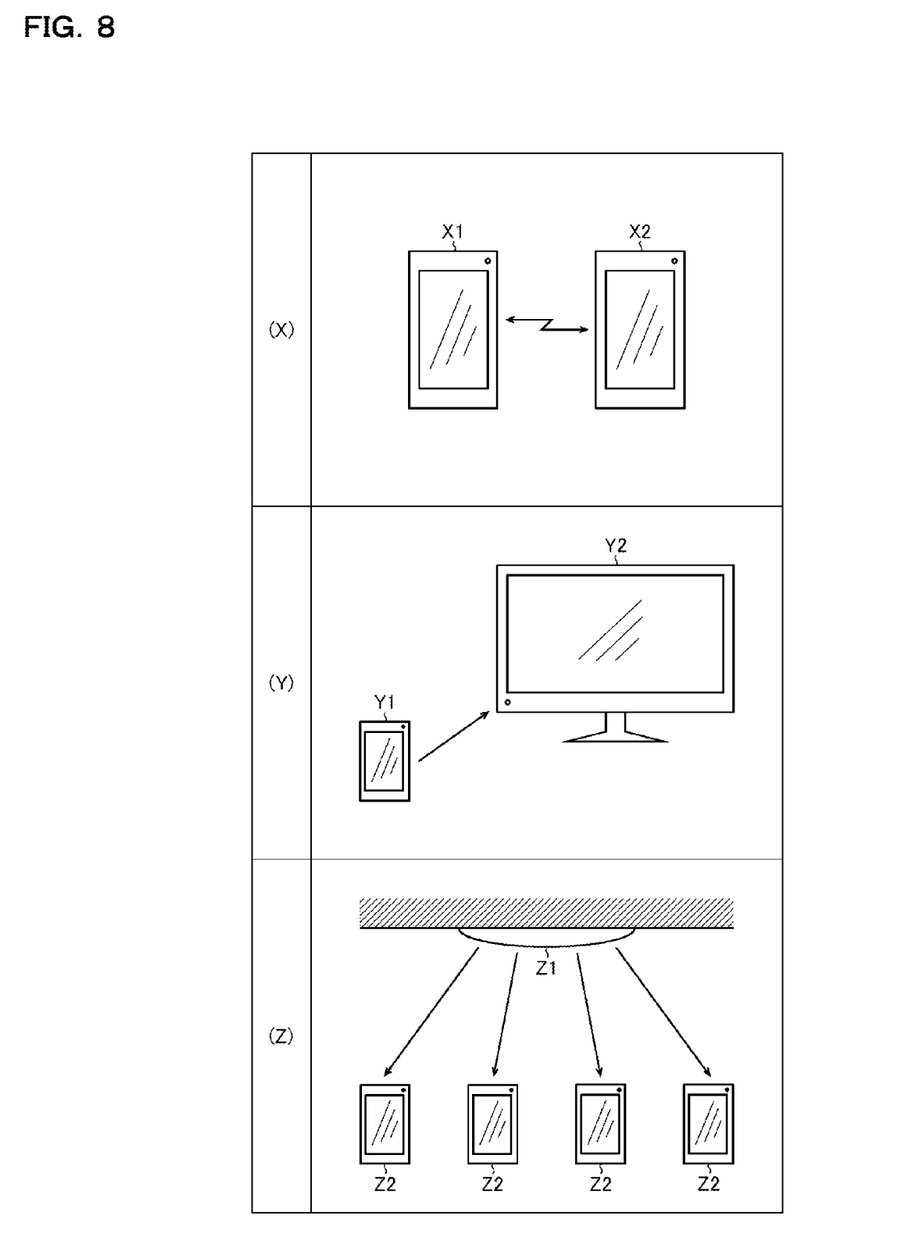
FIG. 8 Table showing a modification example of the visible light communication system.

FIG. 8 is a table showing modification examples of the visible light communication system. In section (X), as before, an example is shown of a configuration in which visible light communication (e.g., mail address exchange) is carried out between electronic devices X1 and X2 (e.g., smart phones). With the visible light communication system of this configuration example, the electronic devices X1 and X2 each function as transceivers.

Section (Y) of this drawing shows an example of a configuration in which visible light communication (e.g., sending of a remote operation signal) is carried out in one direction from an electronic device Y1 (e.g., a smart phone and/or digital camera) to an electronic device Y2 (e.g., a stationary television). With the visible light communication system having this configuration, the electronic device Y1 functions as a transmitter, and the electronic device Y2 functions as a receiver.

In section (Z) of the drawing, an example of a configuration is shown in which 1:N visible light communication (e.g., simultaneous transmission of shared group data) is carried out from an electronic device Z1 (e.g., overhead illumination) to an electronic device Z2 (e.g., a smart phone). In the visible light communication system of this specification, the electronic device Z1 functions as a transmitter, and the electronic device Z2 functions as a receiver.

Other Modification Examples

In addition, various technological features disclosed in this specification can undergo various modifications within a scope that does not deviate from the gist of the technical creation thereof. Specifically, the above embodiments generally are to be considered as examples rather than as limitations, and the technological scope of the invention is to be interpreted as being represented by the scope of the claims, rather than by the descriptions of the embodiments, with all modifications being interpreted as equivalent in meaning to and within the scope of, the claims.

INDUSTRIAL APPLICABILITY

The invention disclosed in this specification, for example, can be used in order to suppress increases in size and cost when providing multifunctional electronic devices (e.g., portable telephone terminals) with visible light transmission functionality.

What is claimed is:

1. An electronic device comprising the following:
a brightness sensor;
a first light-receiving circuit for brightness detection;
a second light-receiving circuit for visible light communication;
a selector that switches the contact point of said brightness sensor to said first light-receiving circuit or said second light-receiving circuit; and
a control part that controls said selector in accordance with whether data is being received by visible light communication.

2. The electronic device according to claim 1, which is also used as a portable device.

3. An electronic device comprising the following:
a display part;
a brightness sensor;
a display drive part for drive-controlling said display part;
a first light-receiving circuit for brightness detection;
a second light-receiving circuit for visible light communication;
a selector for switching the contact point of said brightness sensor to said first light-receiving circuit or second light-receiving circuit; and
a control part for controlling said selector in accordance with whether data is being received by visible light communication while also controlling said display drive part so that ON/OFF control of said display part is carried out in accordance with the transmitted data during data reception by visible light communication.

4. The electronic device according to claim 3, further comprising memory that stores a control program for the electronic device, wherein said control part reads and executes said control program from said memory, thereby controlling said selector in accordance with whether data is being received by visible light communication while also controlling said display drive part so that ON/OFF control of said display part is carried out in accordance with the transmitted data during data reception by visible light communication.

5. The electronic device according to claim 4, which is also used as a portable device.

6. The electronic device according to claim 3, which is also used as a portable device.

* * * * *